United States Patent [19]

Kiessling et al.

[11] 4,351,497
[45] Sep. 28, 1982

[54] CASSETTE FOR BAND MATERIAL

[75] Inventors: Werner Kiessling, Unterhaching; Otto Wiedemann, Starnberg; Peter Lau; Gabriel Vondrovsky, both of Munich, all of Fed. Rep. of Germany

[73] Assignee: Agfa-Gevaert Aktiengesellschaft, Leverkusen, Fed. Rep. of Germany

[21] Appl. No.: 233,102

[22] Filed: Feb. 10, 1981

[30] Foreign Application Priority Data

Feb. 15, 1980 [DE] Fed. Rep. of Germany ....... 3005630

[51] Int. Cl.³ ................................................ G03B 1/04
[52] U.S. Cl. .................................. 242/194; 242/71.2; 352/156
[58] Field of Search ..................... 242/71.1, 71.2, 194, 242/193; 352/72–78 R, 156

[56] References Cited

U.S. PATENT DOCUMENTS

| 3,455,519 | 7/1969 | Gersch | 242/71.2 |
| 3,599,894 | 8/1971 | Edwards | 242/71.2 |
| 3,622,101 | 11/1971 | Sutliff | 242/194 |
| 3,623,679 | 11/1971 | Neudecker | 242/71.2 |
| 3,726,491 | 4/1973 | Tucker | 242/71.2 |

FOREIGN PATENT DOCUMENTS 961023  1/1975  Canada ............................. 242/71.1

Primary Examiner—Edward J. McCarthy
Attorney, Agent, or Firm—Michael J. Striker

[57] ABSTRACT

A motion-picture film cassette has a pay-out spool and a take-up spool mounted coaxially, but at opposite sides of a divider wall. Film travels in one direction through the wall from the pay-out spool to the take-up spool. An anti-reversing device is provided to prevent reverse movement of the film and/or spools; it includes an annulus of holes in the wall, surrounding the axis of the spools, and a resiliently yieldable finger projecting from that surface of the take-up spool which faces the wall. The finger ratchets over the holes when the take-up spool turns in take-up direction but engages in a respective one of the holes to block reverse movement when the take-up spool attempts to turn in the opposite direction.

9 Claims, 2 Drawing Figures

U.S. Patent  Sep. 28, 1982  4,351,497
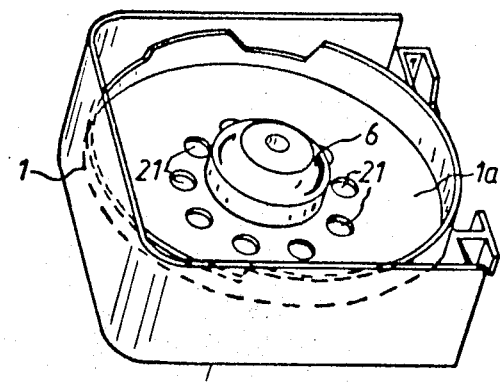
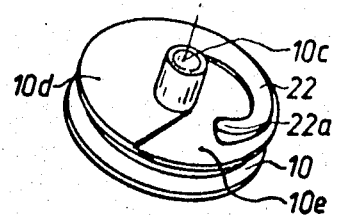
Fig. 2
Fig. 1
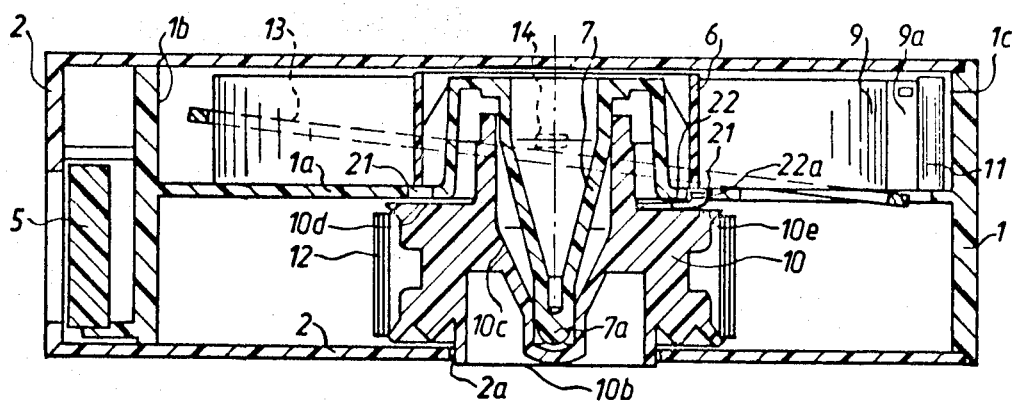

4,351,497

CASSETTE FOR BAND MATERIAL

BACKGROUND OF THE INVENTION

The present invention relates to a cassette for band, tape or ribbon material, such as e.g. photographic film.

More particularly—but not exclusively—the invention relates to a motion picture film cassette having a film supply spool, a film take-up spool coaxial thereto, and a device for preventing rewinding of the exposed film from the take-up spool onto the supply spool.

Motion picture film cassettes for amateur films (i.e. 8 mm and Super-8) having these general features are already known in the art, for example from German Gebrauchsmuster 7, 112, 162, German Pat. No. 2,126,636 and German Published Application No. 2,538,425.

The prior-art cassettes are suitable for their intended purpose. However, further improvements are desirable for a variety of reasons. For example, in one type of prior-art cassette the reverse movement of film is prevented by cooperation of a blocking finger with a blocking tooth. This arrangement is satisfactory if unwinding of the film by almost one complete convolution is acceptable. If this is not acceptable, then a plurality of the blocking teeth must be provided. Moreover, the finger and teeth are provided in an annular hollow formed in the take-up spool. As a result this spool, which is produced by injection molding, becomes quite expensive because it can be produced only with the aid of a complicated (and hence costly) mold.

Similar problems exist in other prior-art cassettes which can be produced only with complicated, costly molds.

Cassettes of this type are mass-produced in very large quantities and it is evident that manufacturing savings of even small or very small magnitude will cumulatively result in very sizable cost reductions, which can be passed along to the consumer.

SUMMARY OF THE INVENTION

Accordingly, it is an object of the invention to provide further improvements over the prior art.

A more particular object of the invention is to provide an improved cassette of the type in question which will have a reliable anti-rewinding arrangement that permits a considerable simplification of both the tools required to produce the cassette and of the cassette manufacturing process itself.

In keeping with these objects, and with still others which will become apparent hereafter, one aspect of the invention resides in a cassette for band material, particularly for photographic film, comprising a housing having a divider wall; a band supply spool at one side of said wall and, coaxial thereto and at the other side of the wall, a band take-up spool in the housing; rotating means for rotating the take-up spool in one direction to withdraw band material from the supply spool and take it up on the take-up spool; and anti-reversing means for preventing rotation of the take-up spool in an opposite direction counter to the one direction, the anti-reversing means comprising a plurality of holes in the divider wall located coaxial to the take-up spool, and a spring finger projecting from a surface of the take-up spool which is juxtaposed with the divider wall, the spring finger being directed in the opposite direction and projecting towards the divider wall.

A cassette according to the invention can be used not only for photographic film, but also for e.g. typewriter ribbons of the type which is used only once and then discarded (carbon ribbons). The holes in the wall separating the two spools need not meet any critical requirements as to exact dimension and circumferential location. Their use obviates the need for springy blocking fingers extending into a hollow and of cam surfaces required to meet rather precise tolerances, thereby eliminating the complicated injection molds, injection processes and injection-mold repairs since the invention permits the use of very simple molds. As for the provision of a blocking finger on the take-up spool, this also is much simpler to accomplish by injection molding than the formation of cam tracks or of springy fingers freely extending into hollows of the spool, so that the spool can be made at less cost, there will be fewer rejects and repairs to the molding tools will be fewer and simpler.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is an enlarged-scale axial section through a cassette embodying the invention; and FIG. 2 is a reduced-scale exploded perspective of the cassette in FIG. 1.

DESCRIPTION OF PREFERRED EMBODIMENTS

The drawing shows in FIGS. 1-2 a film cassette embodying the invention and having a housing 1 provided with a cover 2. The latter is provided with an opening 2a. The housing 1 accommodates a film pressure plate 5 and is subdivided by a transverse wall 1a into two axially adjacent compartments, one of which accommodates the supply spool 6 of annular shape and the other of which accommodates the take-up spool 10.

The supply spool 6 receives in its center opening an axially projecting generally conical member 7 with an approximately semi-circular tip 7a; the member 7 is rigidly connected to the wall 1a or else formed of one piece therewith from synthetic plastic material by injection-molding; the spool 6 may also be injection-molded of one piece with the wall 1a.

During loading of the cassette a coil 9 of fresh film is loosely placed about the spool 6 and a length 9a of the film is guided via roller 11 and pressure plate 5 into the other compartment of the housing 1. The wall 1a is thus located between the non-exposed coil 9 of film on spool 6 and the spool 10 onto which the exposed film is to be taken up.

Spool 10 for taking up a coil 12 of exposed film is formed with a hollow conical configuration 10c which fits over the member 7. After film coil 9 is installed the spool 10 is seated over the member 7, so that it is turnably mounted on the semi-circular tip 7a of member 7. The film length 9a is then connected (known per se) to the spool 10 and the cover 2 installed on the housing 1. When a thus assembled cassette is inserted into a motion-picture camera and coupling or rotating means 10b of the spool 10 (e.g. a recess into which an entraining member fits) brought into engagement with the drive component of the camera, the spool 10 is turned by the drive component and withdraws film from coil 9 to take it up on spool 10 as the coil 12 of exposed film. Of course, in-between the film passes a film window (to the left of plate 5 in FIG. 1) through which it is exposed, but this is state of the art and has nothing to do with the invention.

A ring 13 of rigid material is located in the proximity of wall 1a, loosely surrounding and being turnable about the film coil 9. The ring 13 is freely movable within the space defined by the walls 1a, 1b, 1c and the coil 9, which is to say that it can freely turn about its own axis, shift axially and tilt (see FIG. 1). Its permissible end position can be delimited by abutments 14 on housing 1. The purpose of the ring 13 is to assure that if the coil 9 of unexposed film unwinds, it cannot move into contact with the walls 1b, 1c but can only engage the surrounding ring 13. If that occurs, the ring 13 will turn as the film is subsequently unwound from the coil 9. The advantage of this is that the film will not be scratched by the ring, nor that its frictional resistance to being withdrawn from coil 13 will be increased by contact of the film with the ring. Incidentally, the ring 13 per se is known and could be replaced with an also known-per-se flexible disc (to engage an axial end of the film coil).

The cassette according to the invention has an anti-reverse device which prevents reverse rotation of the spool 10 and which is of especially simple and efficacious construction.

In place of the prior-art radially acting blocking teeth or cams the cassette according to the invention is formed in wall 1a with a plurality of holes 21. These are substantially equiangularly spaced and located on a circle which is coaxial to the axis of rotation of the spool 10. Small variations in the size of the openings 21 and for in the angular spacing between them, are in no way detrimental to proper operation of the device.

The axial end face of spool 10 which faces the wall 1a can be made planar on substantial portions 10d thereof, in contradistinction to the prior art. It is provided with a recess 10e of any desired slope, for example annular, sector-shaped, segment-shaped, or the like. A springy finger 22 of one piece with the spool 10 projects from the surface portion 10d into the recess 10e, counter to the direction of film take-up rotation of the spool 10. It springily projects axially beyond the surface portion 10d and has an end, a surface 22a of which is inclined towards the openings 21.

When the spool 10 with the leading film end portion 9a attached thereto, has been placed upon the member 7 and the cover 2 is put on the housing 1, the spool 10 is pressed very lightly against the wall 1a, just sufficient to assure that the end with surface 22a will resiliently enter into respective openings 21. Rotation of the spool 10 in take-up direction causes the end portion to be resiliently cammed out of the respective openings 21 by the inclined surface 22a and every time this happens the free end will snap back into the next opening, to be cammed out again. In other words: the spool 10 can be readily turned in a sense effecting withdrawal of the film from the coil 9 and take-up on the coil 12 of spool 10. Any intentional or accidental attempt to reverse the rotation of spool 10 will, however, result in the free end of finger 22 abutting against the trailing edge portion of whatever opening 21 it happens to be located in (or to enter into), whereby turning of the spool 10 counter to the film take-up direction is positively prevented. By the same token, of course, the development of slack in the film is also precluded.

It will be appreciated that a cassette having the anti-reversing device just described can be produced with simpler tools and in a simpler, less costly manner than the cassettes of the prior art using cam tracks. Tools to make the openings 21 need not be particularly precise as to tolerances since, due to the axial rather than radial blocking engagement, the actual size of the openings 21 need not be very closely controlled. Naturally, the simpler the tool, the more readily it can be repaired and replaced. The same applies to the molding of the finger 22, which is a much simpler operation—and requires much simpler tools—than the prior-art fingers which project freely into annular spaces extending radially and axially in the take-up spool itself.

The invention is susceptible of a variety of modifications. For example, the openings 21 need not be of circular shape but could have oval, quadratic or rectangular shape, or be sector-shaped. To obtain improved engagement of the end 22a of finger 22 with the trailing (blocking) edge portion of the respective opening 21, the end 22a could be thickened or angled slightly in direction towards the wall 1a. All such modifications or variations are intended to be encompassed within the scope of the appended claims. Any of the synthetic plastic materials known in the art for making cassettes of this general type are also suitable for the present invention, e.g. polyvinyl chloride, polystyrene, polyethylene and others.

While the invention has been illustrated and described as embodied in a cassette for photographic film, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A cassette for band material, particularly for photographic film, comprising a housing having a divider wall; a band supply spool at one side of said wall and, coaxial thereto and at the other side of said wall, a band take-up spool in said housing; rotating means for rotating said take-up spool in one direction to withdraw band material from said supply spool and take it up on said take-up spool; and anti-reversing means for preventing rotation of said take-up spool in an opposite direction counter to said one direction, said anti-reversing means comprising a plurality of holes in said divider wall located coaxial to said take-up spool, and a springy finger projecting from a surface of said take-up spool which is juxtaposed with said divider wall, said springy finger being directed in said opposite direction and projecting towards said divider wall.

2. A cassette as defined in claim 1, wherein said housing and said spools are of synthetic plastic material.

3. A cassette as defined in claim 1, wherein said openings are located on an imaginary circle coaxial to said take-up spool and are equi-angularly spaced from one another.

4. A cassette as defined in claim 1, wherein said openings are circular.

5. A cassette as defined in claim 4, wherein said openings are of identical diameter.

6. A cassette as defined in claim 1, said surface of said take-up spool having a recess, and said finger partly spanning said recess.

7. A cassette as defined in claim 6, wherein said recess is sector-shaped.

8. A cassette as defined in claim 6, wherein said recess is segment-shaped.

9. A cassette as defined in claim 1, said finger having a free end portion provided with an inclined face which projects axially beyond said surface of said take-up spool and towards said divider wall.

* * * * *